US010097630B2

(12) United States Patent
Markus (10) Patent No.: US 10,097,630 B2
(45) Date of Patent: Oct. 9, 2018

(54) TRANSFERRING DATA BETWEEN SITES

(71) Applicant: Red Hat, Inc., Raleigh, NC (US)

(72) Inventor: Mircea Markus, London (GB)

(73) Assignee: Red Hat, Inc., Raleigh, NC (US)

( * ) Notice: Subject to any disclaimer, the term of this patent is extended or adjusted under 35 U.S.C. 154(b) by 471 days.

(21) Appl. No.: 14/598,126

(22) Filed: Jan. 15, 2015

(65) Prior Publication Data

US 2016/0100006 A1    Apr. 7, 2016

Related U.S. Application Data

(60) Provisional application No. 62/058,584, filed on Oct. 1, 2014.

(51) Int. Cl.
*G06F 15/16* (2006.01)
*H04L 29/08* (2006.01)

(52) U.S. Cl.
CPC ...... *H04L 67/1095* (2013.01); *H04L 67/1097* (2013.01)

(58) Field of Classification Search
CPC .......... H04L 67/1097; H04L 67/1095
See application file for complete search history.

(56) References Cited

U.S. PATENT DOCUMENTS

| 5,806,075 A * | 9/1998 | Jain ............. G06F 17/30575 |
| 7,359,975 B2 * | 4/2008 | Martin ............. H04L 29/12009 709/228 |
| 7,392,421 B1 * | 6/2008 | Bloomstein ......... G06F 11/1482 714/4.4 |
| 9,348,627 B1 * | 5/2016 | Palekar ................. G06F 9/46 |
| 2007/0174660 A1 * | 7/2007 | Peddada ........... H04L 41/0663 714/4.1 |
| 2009/0300405 A1 * | 12/2009 | Little ................ G06F 11/203 714/3 |
| 2011/0078494 A1 * | 3/2011 | Maki ............... G06F 11/2028 714/6.12 |
| 2011/0246419 A1 * | 10/2011 | Yancey ................ G06F 11/14 707/624 |

(Continued)

OTHER PUBLICATIONS

Mircea Markus, "infinispal-designs / Design-For-Cross-Site-Replication.asciidoc," https://github.com/infinispan/infinispan-designs/blob/master/Design-For-Cross-Site-Replication.asciidoc#state-transfer-between-sites-version-2, 6 pages, published Nov. 2014 (accessed May 11, 2017).

*Primary Examiner* — Moustafa A Meky
*Assistant Examiner* — Kidest Mendaye
(74) *Attorney, Agent, or Firm* — Womble Bond Dickinson (US) LLP (57) ABSTRACT

The method including, receiving a transfer command at a transfer coordinator node of a first node cluster at a first site to initiate a transfer of data from the first node cluster to a second node cluster at a second site. The method further including causing a status of the second site to be switched from an inactive status to an active status at the nodes of the first node cluster. The method further including initiating a transfer of the data from the first node cluster to the second node cluster. The method further including determining that the second node cluster has the active status at the nodes of the first node cluster and causing the data transaction request to be transferred from the nodes at the first node cluster to the second node cluster during the transfer of the data.

16 Claims, 8 Drawing Sheets

(56) References Cited

U.S. PATENT DOCUMENTS

| | | | |
|---|---|---|---|
| 2011/0307736 A1* | 12/2011 | George | G06F 17/30519 714/6.2 |
| 2012/0246190 A1* | 9/2012 | Surtani | G06F 17/30575 707/769 |
| 2013/0103650 A1* | 4/2013 | Natanzon | G06F 17/30008 707/684 |
| 2013/0151889 A1* | 6/2013 | Markus | G06F 17/30351 714/6.11 |
| 2013/0318146 A1* | 11/2013 | Kanthak | H04L 67/10 709/201 |
| 2014/0019667 A1* | 1/2014 | Shimada | G06F 3/0605 710/316 |
| 2014/0047263 A1* | 2/2014 | Coatney | G06F 11/2023 714/4.11 |

* cited by examiner

TRANSFERRING DATA BETWEEN SITES

CROSS-REFERENCE TO RELATED APPLICATION

This application claims the benefit of U.S. Provisional Application No. 62/058,584, filed Oct. 1, 2014.

TECHNICAL FIELD

The present disclosure pertains to computer systems; more specifically, to transferring of data stored in the memory of computer systems.

BACKGROUND

Data, such as software programs, information, or other forms of data, has become a resource and asset for individuals and businesses. Data can be accessed and stored at device, such as computing devices and data centers. A data center can be a larger collection of servers with increased computing power and storage capacity. A data grid is a distributed storage and processing unit within the boundaries of a data center.

Access by individuals or businesses to data grids within data centers at different locations can provide individuals or businesses with increased data access rates and security. For example, storing data at different locations can provide increased data access rates to financial services, telecommunications, and media and entertainment companies by enabling the companies to access data centers approximate their location. Additionally, storing data in multiple data centers can ensure that data is not lost in the case of catastrophic failures, such as a datacenter being inoperable because of a fire.

DESCRIPTION OF EMBODIMENTS

Data transfer technologies are described herein.

Data is becoming an increasingly important resource and asset to businesses and individuals. Individuals or businesses may store data on a single machine or a single server to provide a fixed and definite location of the data. However, as the amount of data stored and used by individuals and businesses increases, maintaining the data used by that individual or business at a single machine or server can become difficult. In one example, a rate at which data is uploading to a single machine or server in combination with a rate that users access the data can overwhelm a single machine or server. Organizations may use a data grid to store large amounts of data and/or access data owned and stored by multiple organizations. Data grids can manage distributed data, where the data can be stored across multiple locations and multiple types of storage devices. Additionally, a data grid can use a common access method, a common naming scheme, a common authentication method, a common management policy, and so forth. A data grid can include multiple node clusters or data sites. A node cluster or data site is a selected group of nodes or servers. In one example, the nodes in a data site can be within a selected geographic area. In another example, the nodes in a data site can be a selected type of node.

Intra-cluster data replication or local data replication can be a replication of data between multiple servers within a cluster to provide data redundancy in case one or more servers become unavailable in the cluster, such as when one or more servers crash. In one example, data can be distributed uniformly across all the servers in a cluster, with each server storing a replica of data stored in the cluster. For example, when new data is added to one or more servers in the cluster, the data can be persisted and can be replicated to other servers within the cluster. When a server in the cluster goes down, replicated data on one of the other servers in the cluster can be used as active data, e.g. data accessed and/or used by the cluster for different applications. In another example, each server in the cluster can store active data and replicated data (e.g. backup data). Additionally, when a new server is brought online in a cluster, data that already exists at a peer server can be transferred to the new server as part of an initialization process.

Cross data center replication (e.g. X-site data center replication) can comprise replicating active data or stored data to multiple clusters of servers, e.g. different locations of data centers that include one or more data grids. In one example, the multiple data centers or sites can be located at the same geographic location. In another example, the multiple data centers can be located at different geographic locations, e.g. different site locations. In one example, the data centers can be located at different sites to enable recovery of data in the event a disaster occurs at one of the geographic locations of a data center. In another example, the data centers can be located at different sites to enable users faster access to data at a data center located closer to a location of the users, relative to a location of another data center. In another example, cross data center replication can enable data center users, such as system administrators, to create data backups at different sites and/or multiple data centers. An advantage of cross data center replication can be to provide data redundancy across server clusters. Additionally, when a new data center or site is brought online in a grid, data that already exists at another data center can be transferred to the new data center or site as part of the initialization process. However, traditionally when data is replicated between data centers or between servers in a cluster, users may not be able to access the data while the data is being replicated (such as during a state transfer). The inability of a user to access data can be problematic for users when accessing the data is time critical, such as a hospital patient's medical or stock market information that can time critical when exchanging stocks. Because restricting access to critical information for a period of time can be problematic, transferring data and/or backing up data between data sites has traditionally been difficult.

Aspects of the present disclosure address the above noted deficiency by using a phased commitment of data within and between sites. When a request to transfer data between data sites is received, such as by a data grid manager or another application, the phased commitment of data can begin by directing any new data entry to the new data site. Additionally, each node in a data site currently being used can iterate through data entries at each node and send the data (a key-value pair) to the local site master that in turn sends the data to the new site. A data site can include a state transfer coordinator node or a master node with a local site master for the site. The local site master can be a gateway for other nodes at the site to communicate with master nodes at other sites. In one example, a site master can maintain a routing table that includes a list of sites and site masters. When the data has been fully transferred, the user can be switched over to the new data site. When data is replicated between data centers or between servers in a cluster, users can continue to access the data (e.g. are not blocked from the data) while the data is being replicated.

A data grid can comprise a grid of date centers or data sites. The data sites can include one or more nodes, e.g. a node cluster. Each node can comprise local storage that includes memory storage, such as memory cache or random access memory (RAM), and disk memory, such as non-transitory computer readable storage media. Each node in the grid can execute a process to discover the other nodes in the grid using a communications network. In one example, the communications network can be a wired network, such as an coaxial or optical cable network. In another example, the communications network can comprise a wired network, such as a local access network. In another example, the communications network can comprise a cellular network. The cellular network can operate using a cellular standard, such as the third generation partnership projection (3GPP) long term evolution (LTE) Rel. 8, 9, 10, 11, or 12 standard, or the institute of electronic and electrical engineers (IEEE) 802.16p, 802.16n, 802.16m-2011, 802.16h-2010, 802.16j-2009, or 802.16-2009 standard. In another example, the communications network can comprise a wireless network. The wireless network can operate using a wireless local area network (such as a wireless fidelity network (Wi-Fi)) or a wireless wide area network (WWAN) using a standard such as the IEEE 802.11-2012, IEEE 802.11ac, or IEEE 802.11ad standard.

In one example, a memory storage capacity of a data site can be equal to a sum of the memory storage of each server at the site. In another example, a memory storage capacity of the site can be equal to a portion of the memory storage of one or more of the servers at the site. In another example, a memory storage capacity of the grid can be equal to a sum of the memory storage of each node in the grid. In another example, a memory storage capacity of the grid can be equal to a portion of the memory storage of one or more of the nodes in the grid.

When the data grid stores data in memory of the nodes, the data grid can be an in-memory data grid. In one example, a data grid can store data in a key-value format. In one example, the data grid can include a designated node, e.g. a site-master, to manage replication of data between data sites in the data grid. In another example, the data grid can include a plurality of site masters. For example, the data grid can include a plurality of site masters to manage replication of data between different sites of the grid. In another example, each data site can include a local site master to manage a transfer of data from nodes at the site to nodes at another site. In one example, data can be replicated between data sites asynchronously because of a latency in transferring data between data sites. In another example, data can be transferred synchronously, e.g. while the data is being accessed at one or more sites or data centers.

In another example, a data grid can use consistent hashing for key-value pair storage to enable the determination of data locality in the data grid. Data locality can be the locating or grouping of data at a node of a site or at a site in a data grid based on usage or access of the data at the node or the site. For example, when a data grid has consistent data-access patterns (such as accessing the same data for query searches in a data grid), locating frequently accessed data at a site in the data grid that is physically closest to a requesting user or an application relative to other sites in the data grid can be good data locality. A site master of a site in a data grid can use consistent hashing to determine where to locate or group data in a data grid to increase data locality. In one example, a site-master in the data grid can communicate with nodes in the data grid. In another example, the site-master can communicate with other site masters at other sites. The nodes can communicate data access patterns or data usage with the site master. The site-master can then use consistent hashing to determine where to locate data at the different nodes at site and/or at different sites based on the data access patterns or data usage. Additionally, the site-master can use consistent hashing to sort the keys of the key value pairs and assign similar keys to related data for increased data locality by locating or grouping data with similar keys at the same node or the same site in a data grid.

In one example, cross-center data center replication can be used to provide a standby data center (hot-standby) for when there is a data center failure in a geographic location (e.g. geographic failover). For example, a medical system can use critical data (such as a status of a patient) where data availability requirements demand the critical data to be available at all times of the day. In this example, the medical system of a hospital in London can deploy a master data center located in London and a slave data center (e.g. a backup data center) located in San Francisco. The medical system can use the master data center to store and access the critical data. When the master data center fails, the medical system can use the slave data center to access the critical data. One advantage of the master data center being located closer to the hospital relative to the slave data center can be to provide faster access to the critical data. Another advantage of the slave data center being located farther from the hospital relative to the master data center can be to provide geographic separation, such as in the event of a disaster at or near the location of the master data center. In one example, the medical system can send the critical data to the master data center and the master data center can transfer the critical data to the slave data center. In another example, the medical system can send the critical data to both the master data center and the slave data center.

In one example, cross center data center replication can be used to provide an active user or a plurality of active users a data center closest to the active user or the plurality of active users. In another example, an active user can be a user that is using the data center during a selected period of time, such as during a typical work day period of 9 am to 5 pm.

For example, an international bank may provide a data center with banking information closer to where active users are located, e.g. a London data center may be active in the morning for bankers in the London area, then as time expires a New York City data center may be active for bankers in the New York City area, and then as time expires a San Francisco data center may be active for bankers in the San Francisco area (i.e. following the sun). In another example, an active user can be a user with an activity level for using the data center that exceeds a threshold activity level. For example, on a first day a user activity level in San Francisco may exceed a threshold activity level and the San Francisco data center may be active and on a second day a user activity level in London may exceed a threshold activity level and the London data center may be active. In one example, one data center may be active while other data centers are inactive or running in a backup mode or sleep mode. In another example, a plurality of data centers may be active at the same time.

In one example, a data grid may include a plurality of data centers or data sites. In one example, data may be transferred between data centers synchronously, e.g. as the data is received at a data center. In another example, data may be transferred between data centers asynchronously, e.g. there is a latency or delay between when data is received at a data center and when the data is transferred or backed up at other data centers. In another example, data can be concurrently written between sites or data centers, e.g. the data can be written to multiple data centers at the same time. For example, a first data center can be gracefully shutdown at first site as existing users finish using the data center and new clients can be directed to second site. In this example, a plurality of data items identified by a plurality of keys of a key-value pair may be written concurrently to different data centers for a period of time, e.g. existing clients may write one or more data items to the first site that is gracefully shutting down and new clients may write one or more data items to the second site.

In another example, cross-center data center replication can be used to provide a geographic data partitioning to provide different local sites to different users. For example, an international company with different clients located at different sites can provide different local sites to the different clients, e.g. European clients can access a London data center and US clients can access a New York City data center or a San Francisco data center based on their location.

In one example, one or more data centers can be backup sites of another data center. For example, the London data center can be a local data center to clients in London and can be a backup for the New York City data center. In one example, a data center can be a backup data center for one other data center. In another example, a data center can be a backup data center for a plurality of data centers. In another example, a plurality of data items identified by a plurality of keys can be transmitted to several data centers for concurrent writes in geographic data partitioning.

Figure 1:
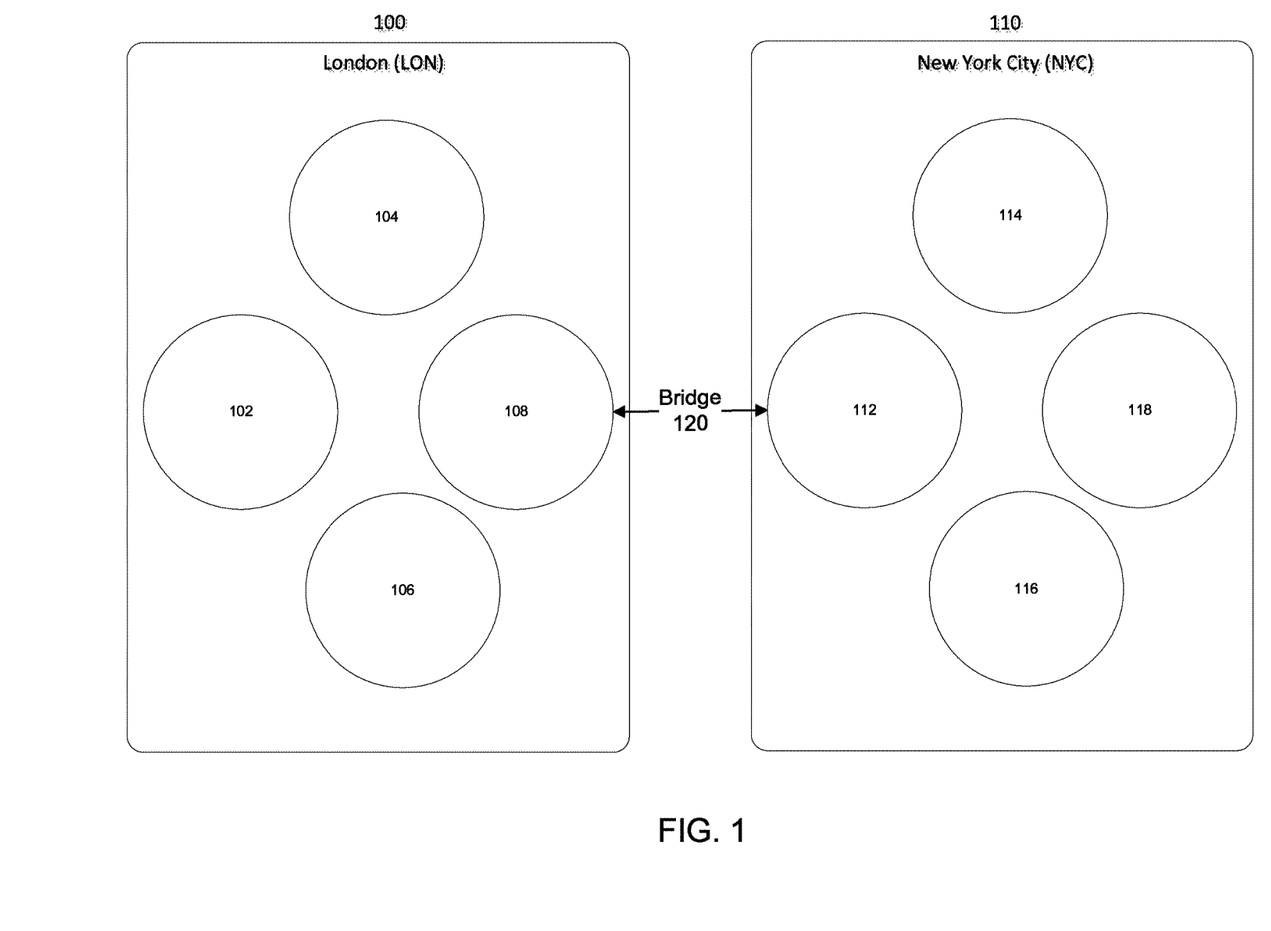
FIG. 1 illustrates a plurality of data center sites with nodes according to one embodiment.

FIG. 1 illustrates a plurality of data center sites 100 and 110 with nodes 102-108 and nodes 112-118, respectively. FIG. 1 further illustrates that the data center sites 100 and 110 can transfer data, such as key-value pairs or configuration information, between the data center site 100 and the data center site 110. In one example, data center site 100 can be located in London (LON) and the data center site 110 can be located in New York City. In this example, data center site 100 can transfer data to the data center site 110 from one or more of the nodes 102, 104, 106, and/or 108. In another example, data center site 110 can transfer data to the data center site 100 from one or more of the nodes 112, 114, 116, and/or 118. The number of data center sites and nodes illustrated in FIG. 1 is not intended to be limiting and the number of data center sites in a data grid or the number of nodes at a data center site can vary. In one example, the nodes 102-108 and the nodes 112-118 can form clusters for each data center site. For example, a first cluster can comprise of nodes 102, 104, 106, and 108 at data center site 100 and a second cluster can comprise of nodes 112, 114, 116, and 118 at data center site 110. In another example, the nodes 102-108 and nodes 112-118 can form virtual clusters. For example, a first virtual cluster can comprise of nodes 102, 104, 112, and 114 and a second virtual cluster can comprise of nodes 106, 108, 116, and 118. In certain implementations, each cluster may employ data messaging (such as JGroups) for intra-cluster communications among the nodes of the cluster.

FIG. 1 further illustrates that data can be transferred between data center site 100 and data center site 110 using a bridge 120 between the sites. In one example, the bridge 120 can use a transmission control protocol (TCP) communications protocol. In another example, the bridge 120 can use a user datagram protocol (UDP) communication protocol.

Figure 2:
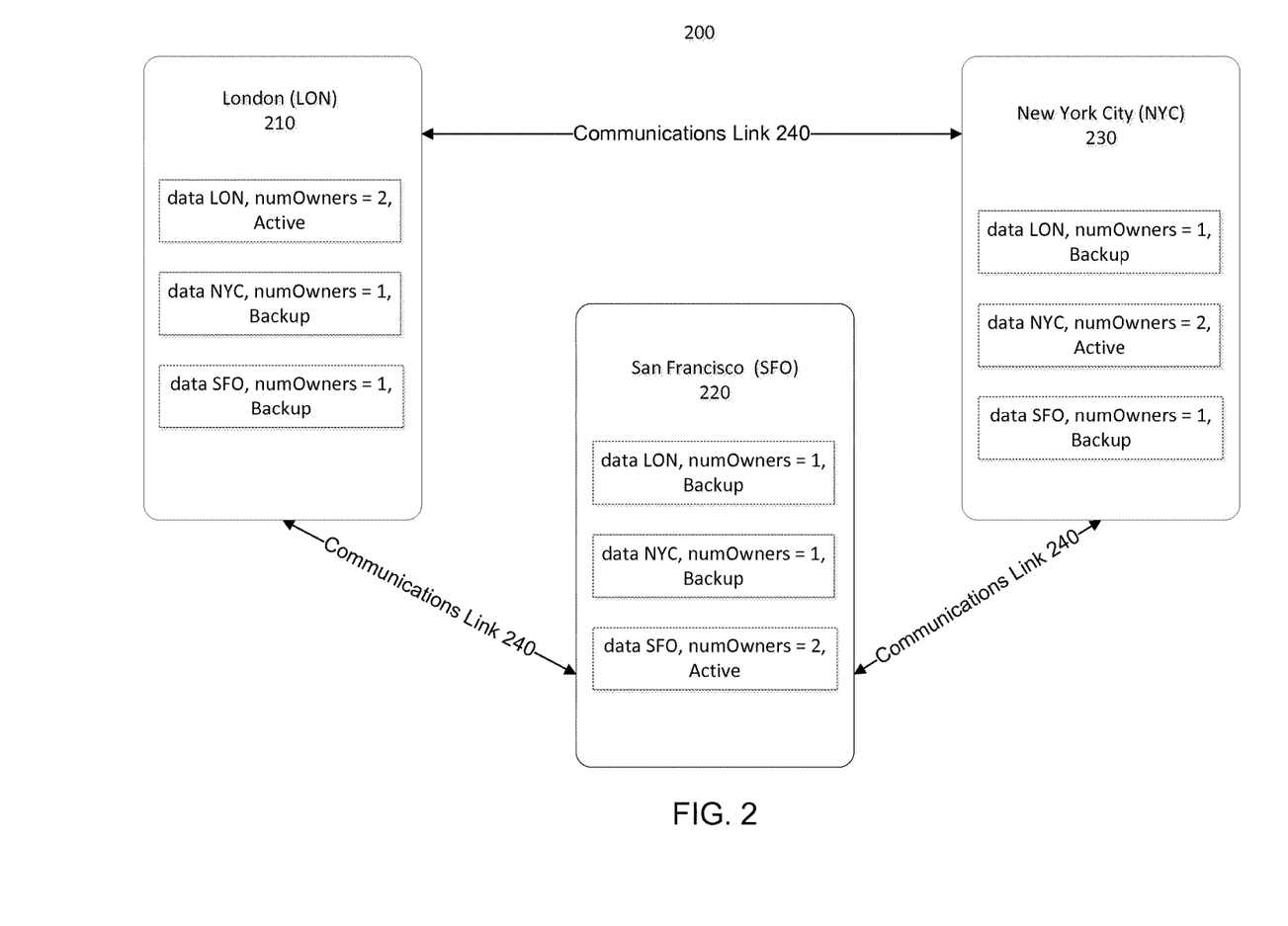
FIG. 2 illustrates a data grid with a plurality of data center sites according to one embodiment.

FIG. 2 illustrates a data grid 200 with a plurality of data center sites 210, 220, and 230. In one example, data center site 210 can be located in London (LON), data center site 220 can be located in San Francisco (SFO), and data center site 230 can be located in New York City (NYC). In this example, users in different geographic regions can connect to a data center site geographically closest to the user, e.g. users in the United Kingdom (UK) can connect to the LON data center site 210, users on the west coast of the United States (US) can connect to the SFO data center site 220, and users on the east coast of the United States (US) can connect to the NYC data center site 230. In another example, each of data center sites 210, 220, and 230 can operate on a data set unique or distinct to the data center site, e.g. the data users in LON access different data at the LON data center site 210 than users in SFO or NYC accessing data at the SFO data center site 220 or the NYC data center site 230, respectively.

FIG. 2 further illustrates the plurality of data center sites 210, 220, and 230 can be used as active sites (e.g. a primary site) and backup sites (e.g. a secondary site). In another example, each data center site 210, 220, and 230 can store selected data of the data grid. In another example, each data center site 210, 220, and 230 can store all the data of the data grid.

In one example, a data center site 210, 220, and/or 230 can have a primary backup (e.g. a data backup for the active site) and a secondary backup (e.g. a data backup for other sites). In another example, a primary backup can store multiple copies of the data (such as 2 copies of the data) for the data center site where the memory is located and a secondary backup can store a single copy of the data for other data center sites. In another example, a primary backup can store one copy or multiple copies of the data for the data center site where the memory is located and a secondary backup can store one copy or multiple copies of the data for other data center sites, or any combination thereof. In one example, data center sites 210, 220, and/or 230 can use communications links 240 to transfer data between the data center sites. In one example, the communications links 240 between the data center sites can be provided by TCP links.

In one example, within each data center site 210, 220, and 230 a different number of replicas for each data item (numOwners) can be configured for local data and for backup data. For example, the LON data center site 210 can store 2 replicas for each data item (numOwners=2) for a LON data partition (data LON, numOwners=2) and store 1 replica for each data item (numOwners=1) for a NYC data partition (data NYC, numOwners=1) and a SFO data partition (data SFO, numOwners=1). In another example, the SFO data center site 220 can store 2 replicas for each data item (numOwners=2) for a SFO data partition (data SFO, numOwners=2) and store 1 replicas for each data item (numOwners=1) for a NYC data partition (data NYC, numOwners=1) and a LON data partition (data LON, numOwners=1). In this example, when a data center site goes down, e.g. due to a site failure or for maintenance, users in the data center site region can be transparently migrated to a backup site. For example, if the LON data center site 210 goes down for maintenance, the UK users can access data on the data grid by connecting to the NYC data center site 230.

In another example, the number of replicas for each data item (numOwners) can be changed dynamically to accommodate fail-over, e.g. if the LON data center site 210 goes down and LON users can be redirected to the NYC data center site 230, which has numOwners=1 for the LON data, then the data grid can increase the numOwners (such as numOwners=2) for LON data at the NYC data center site 230. In one example, data replication between data center sites can be synchronous. In another example, data replication between data center sites can be asynchronous or configurable.

In one example, the data grid can be configured for inter-site data transfer or inter-site state transfer. An inter-site state transfer can be a transfer of all the data and configuration information (e.g., information used to save and restore a configuration of a site) of a node at the first data center site or of a first data center site to a second data center site. The second data center site can use the data and configuration information to configure a node at the second data center site or configure the second data center site to mirror the node at the first site or the first data center site. For example, when the LON data center site 210 is shut down and then restarted, on startup the LON data center site 210 can fetch data or configuration information from the NYC data center site 230, such as data or configuration information from LON data center site 210 users when the LON data center site 210 users were migrated over the NYC data center site 230 during an outage of the LON data center site 210. In one example, the LON data center site 210 can use the configuration information to setup the LON data center site 210 and configure nodes at the data center site 210 and then store the data at the configured nodes. In one example, the data or configuration information can be active data or configuration information, backup or inactive data or configuration information, or a combination thereof.

In one example, when a location of a data center site is changed or added and/or a node is added to a data center site, the relocation or addition of the data center site or the node may not trigger a data transfer from any of the data center sites 210, 220, and/or 230. In another example, when a location of a data center site is changed or added and/or a node is added to a data center site, the relocation or addition of the data center site or the node may trigger a data transfer from one or more of the data center sites 210, 220, and/or 230.

Figure 3:
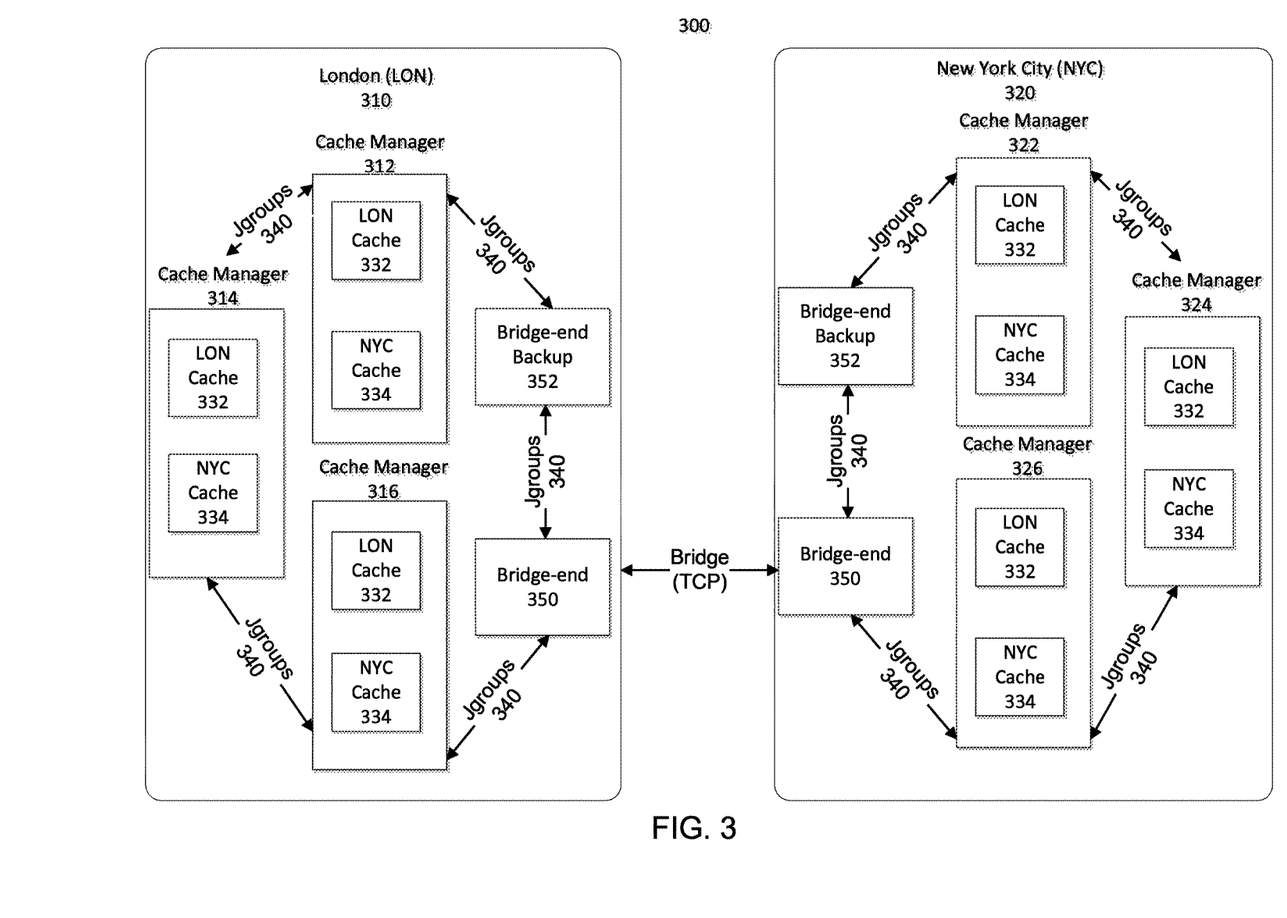
FIG. 3 illustrates a diagram data grid of a plurality of data center sites with nodes employing cache managers and including caches corresponding to different data partitions according to one embodiment.

FIG. 3 illustrates a diagram data grid 300 of a plurality of data center sites 310 and 320 with nodes 312-316 and 322-326 (respectively) employing cache managers and including caches 332 and 334 corresponding to different data partitions. In one example, each cache manager or node 312-316 and 322-326 can contain a plurality of caches 332 and 334, such as a data partition for a data center site that the cache manager or node is located at, and another data partition for another data center site at a different location. In another example, a cache name can correspond to a data center site name that data is held for, e.g. the LON cache 332 corresponds with the London data center site and the NYC cache 334 corresponds with the New York City data center site.

In one example, data can be replicated between the data center sites using data messaging links 340, such as JGroups bridges. In one example, a site-master can be a node or a set of nodes that is part of a data messaging cluster on which the caches 332 and 334 are deployed. In another example, a bridge node may not have any caches residing on the bridge node. In another example, a data messaging link 340 can support fail-over of one or more site-masters, e.g. when a site-master goes down, another node can assume the site-master role so that the data is not lost and/or is retransmitted. In another example, a bridge end 350 or a bridge-end backup 352 of a data messaging link 340 can use a store-and-forward function when a data messaging link 340 goes down for a period of time (e.g. due to an outage) to store data while the data messaging link 340 is down, and then existing data center sites can re-send data that was not delivered during the outage. In another example, the bridge and/or the bridge-end backup 352 can be cache managers or nodes In one example, a one-phase transaction can be used for an inter-site transaction propagation, where data is propagated or transferred from one site to the other during a transaction commit. An advantage of the one phase transaction can be an increase in performance due to a simplicity of the transaction. In another example, two-phase transactions can be used for inter-site data replication, such that when a transaction is committed, a PREPARE message is sent to the participating nodes. Upon to receiving acknowledge messages from all participating nodes, a COMMIT message is sent. Alternatively, a ROLLBACK message may be sent when one or more nodes failed to acknowledge the PREPARE message. An advantage of the two phase transaction is that the two phase transaction can support data being modified at a data center site and a backup data center site. In one example, each cache 332 and 334 can be separately configured for the one phase transaction or the two phase transaction. In another example, each cache 332 and 334 can be configured for a same one phase transaction or two phase transaction.

Figure 4:
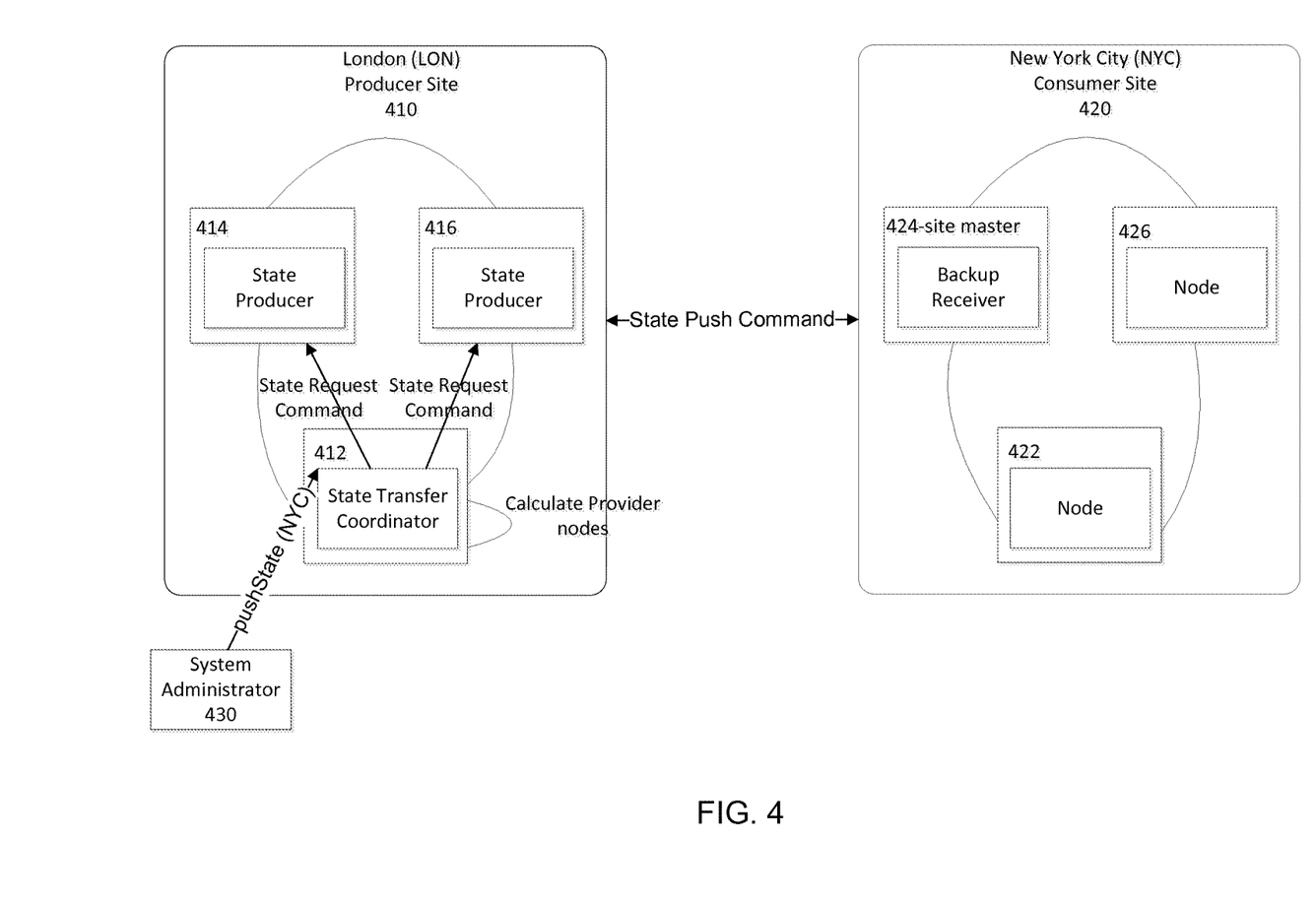
FIG. 4 illustrates a data center at a first site fetching data that is owned or backed up from another data center at a second site according to one embodiment.

FIG. 4 illustrates a data center at a data center site 410 fetching data, such as a state, that is owned and/or backed up at another data center at another data center site 420. In one example, a data center site can fetch data from an inactive site. In another example, a data center site can fetch data from a running site. For example, a LON site 410 can be running and a new site NYC 420 can be started up or initiated. In this example, the NYC site 420 can request a transfer of a state from the LON site 410. In one example, the LON site 410 can be a state producer site and the NYC site 420 can be a state consumer site. A system administrator 430 can connect to a node 412 at the LON site 410 and issue a pushState command, such as a pushState(NYC) command, to the node 412. In one example, the node 412 that receives the pushState(NYC) request can be a state transfer coordinator, such as a cross-site state transfer coordinator (XSTC). When the node 412 receives the pushState(NYC) request, the LON node 412 can initiate a state generation at the LON site 410. In one example, the LON node 412 can initiate a state generation using an XSiteStateProvider software component.

The node 412 can broadcast a state request command, such as a cross-site state request command (XSStateRequestCommand), to the other nodes 414 and/or 416 at the LON site 410, thus requesting one or more nodes transfer at least part of the node state. In one example the node 412 can broadcast the state request command when the state generation is initiated. In another example, the XSStateRequestCommand can be sent from the XSiteStateProvider to the local LON nodes 412, 414, and/or 416.

In an illustrative example, the data grid may implement a one phase cross-site state transfer. When a LON node 414 or 416 receives the XSStateRequestCommand, the LON node 414 or 416 can set a NYC site mode to an active mode, so that when the LON node 414 or 416 receives an update (e.g., comprising one or more modified and/or newly added data items), the LON node 414 or 416 can forward the update through a site master at the LON site 410 to the NYC site 420. Furthermore, upon setting the NYC site mode to the active mode, one or more LON primary owner nodes of the LON site 410 can iterate over at least part of the node state (e.g., identified by certain keys), and send at least part of the node state to the NYC site. In one example, each node 414 and 416 can iterate over a local state at the node 414 or 416 and when the node 414 or 416 is a primary owner of a data item identified by a certain key, the node 414 or 416 can push the data item (such as an entry in a transaction table) to a bridge end of the LON site 410.

In one example, the LON site 410 can forward updates and selected data to the NYC site 420 simultaneously. In another example, the LON site 410 can forward the updates and the selected data to the NYC site 420 sequentially or at different times.

Responsive to receiving each state transfer message, node 422, 424, and/or 426 can apply (i.e., locally store) the received state. Responsive to completing the state transfer, the LON node 412, 414, and/or 416 can notify the XSTC. In one example, the NYC site 420 can start processing incoming requests by each NYC node 422, 424, and 426 after successfully applying the state transfer. Alternatively, the NYC site 420, may support concurrent state transfer and processing incoming data modification requests. NYC site 420 may keep track of keys identifying the data items that have been updated by incoming data modification requests, in order to discard a state transfer for a previously modified data item (i.e., when such a state transfer is received after the modification request).

In another illustrative example, the data grid may implement a two-phase cross-site state transfer. Responsive to receiving the XSStateRequestCommand, the LON node 412, 414, and/or 416 can set NYC site mode to the active mode and start forwarding requests received at the LON node 412, 414, and/or 416 to a NYC node 422, 424, and/or 426. Each node being the primary data owner at LON site 410 can temporarily block prepare, commit, and rollback commands. The node can transfer to NYC nodes 422, 424, and/or 426 the transactions in a transaction table that are prepared but not committed or rollbacked. Prepare commands can be forwarded to the NYC site 420 when the prepare commands are received at the LON site 410. In one example, the prepare commands can be sent simultaneously or synchronously with other commands (such as commit or rollback commands). In another example, the prepare commands can be sent sequentially with other commands or at different times than other commands. An advantage of sending the prepare commands synchronously with other commands can be that the NYC site can receive a prepare command before a commit command to avoid reordering of the other commands, such as commit commands or rollback commands.

Responsive to completing the transaction data transfer, LON nodes 412, 414, and/or 416 may initiate the state transfer, as described herein above with respect to the one-phase cross-site state transfer scheme.

Figure 5A:
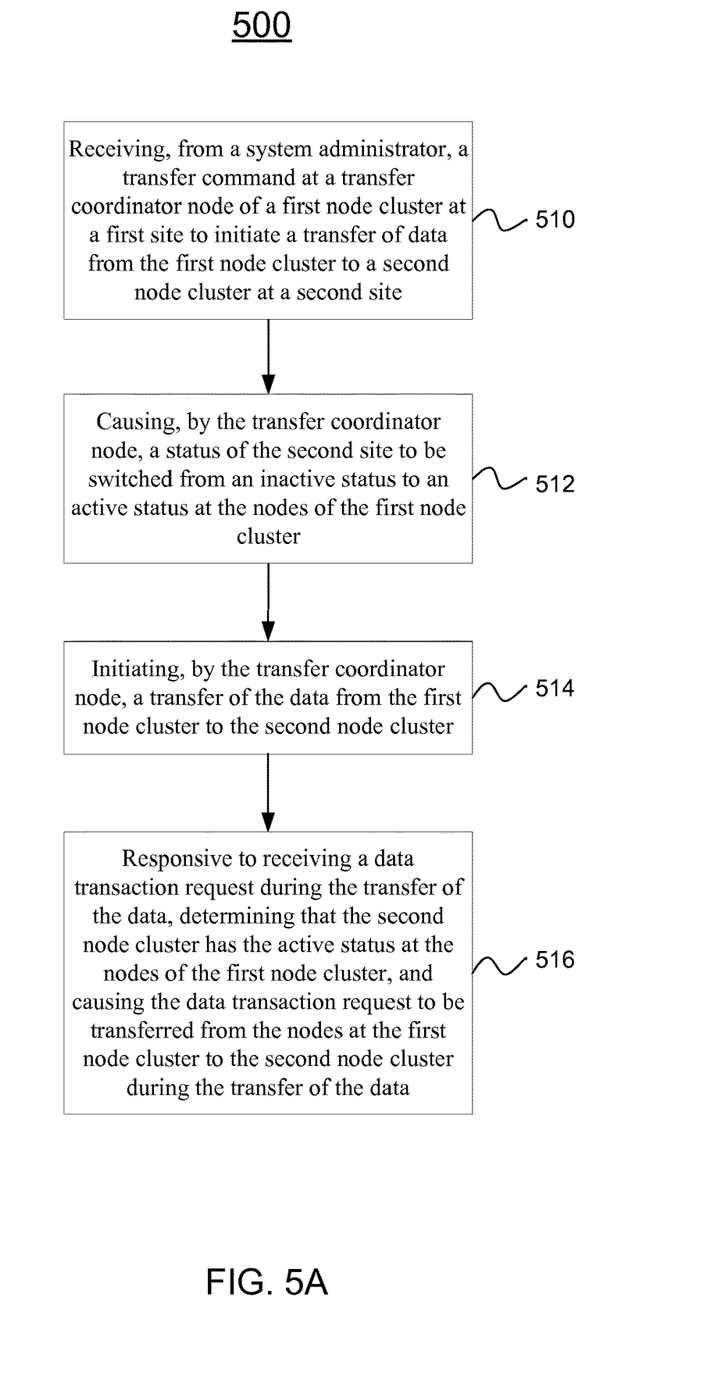
FIG. 5A is a flow diagram of a method of transferring data between data grids at different locations according to one embodiment.

FIG. 5A is a flow diagram of a method 500 of transferring data between data grids at different locations. Method 500 may be performed by processing logic that may comprise hardware (e.g., circuitry, dedicated logic, programmable logic, microcode, etc.), software (such as operations being performed by the MCU), firmware or a combination thereof. In one example, method 500 is performed by processor, a plurality of processors, a processor core, and/or a plurality of processor cores. Alternatively, other components of a computing system or software executing on the processor may perform some or all of the operations of the method 500.

Referring to FIG. 5A, the method 500 begins by receiving, from a system administrator, a transfer command at a transfer coordinator node of a first node cluster at a first site to initiate a transfer of data from the first node cluster to a second node cluster at a second site, where the first node cluster comprises multiple nodes and the second node cluster comprises multiple nodes (block 510). The method can include causing, by the transfer coordinator node, a status of the second site to be switched from an inactive status to an active status at the nodes of the first node cluster (block 512). The method can further initiating, by the transfer coordinator node, a transfer of the data from the first node cluster to the second node cluster (block 514). In one example, responsive to receiving a data transaction request during the transfer of the data, determining that the second node cluster has the active status at the nodes of the first node cluster, and causing the data transaction request to be transferred from the nodes at the first node cluster to the second node cluster during the transfer of the data (block 516).

In one example, the method can further include receiving, at the transfer coordinator node, a notification that the transfer of the identified data is complete. In another example, the data being transferred can be identified for transfer by a local site master associated with the first node cluster or by the nodes of the first node cluster. In another example, the method can further include comprising, responsive to receiving the data transaction request during the transfer of the data, blocking at least one command received at the nodes of the first node cluster, the at least one command comprising at least one of: a prepare command associated with the data being transferred; a commit command associated with the data being transferred; or a rollback command associated with the data being transferred. In another example, the first site of the first node cluster and the second site of the second node cluster can reside at different geographic locations. In another example, the data transaction request can be request from an application to access or modify data at the nodes of the first node cluster.

Figure 5B:
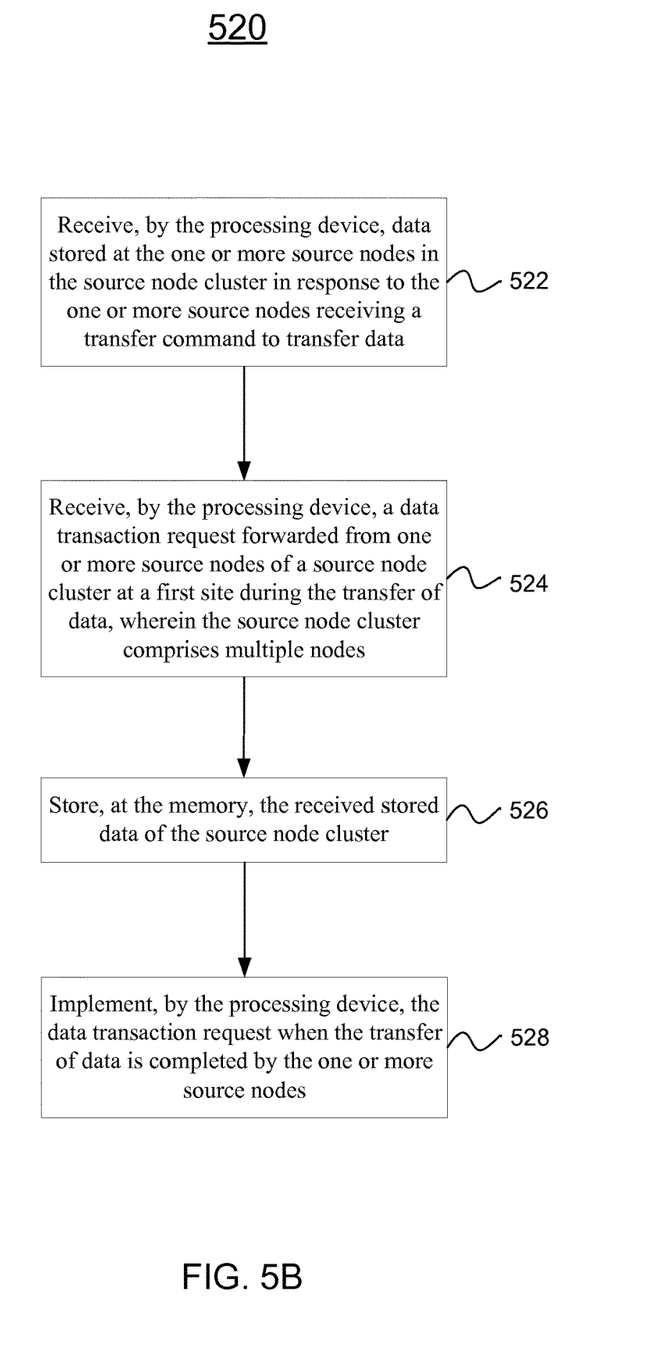
FIG. 5B a flow diagram of a functionality of a processing device including a non-transitory storage medium having stored thereon instructions which when executed cause the processing device to execute operations to transferring data between data grids at different locations according to one embodiment.

FIG. 5B is a flow diagram of a functionality 520 of a destination node. In one example, the destination node can include a memory to store data and a processing device that can be coupled to the memory. The processing device can receive data stored at the one or more source nodes in the source node cluster in response to the one or more source nodes receiving a transfer command to transfer data (block 522). The processing device can further receive a data transaction request forwarded from one or more source nodes of a source node cluster at a first site during the transfer of data, wherein the source node cluster comprises multiple nodes (block 524). The processing device can further store, at the memory, the received stored data of the source node cluster (block 526). The processing device can further implement the data transaction request when the transfer of data is completed by the one or more source nodes (block 528).

In one example, the destination node is a node in a destination node cluster at a second site. In another example, the data transaction request can include a data modification command to add to the stored data, delete at least a portion of the stored data, change the stored data, or access the stored data. In another example, the data transaction request can include data received at the source nodes of source node cluster during an iteration process to communicate the stored data.

Figure 5C:
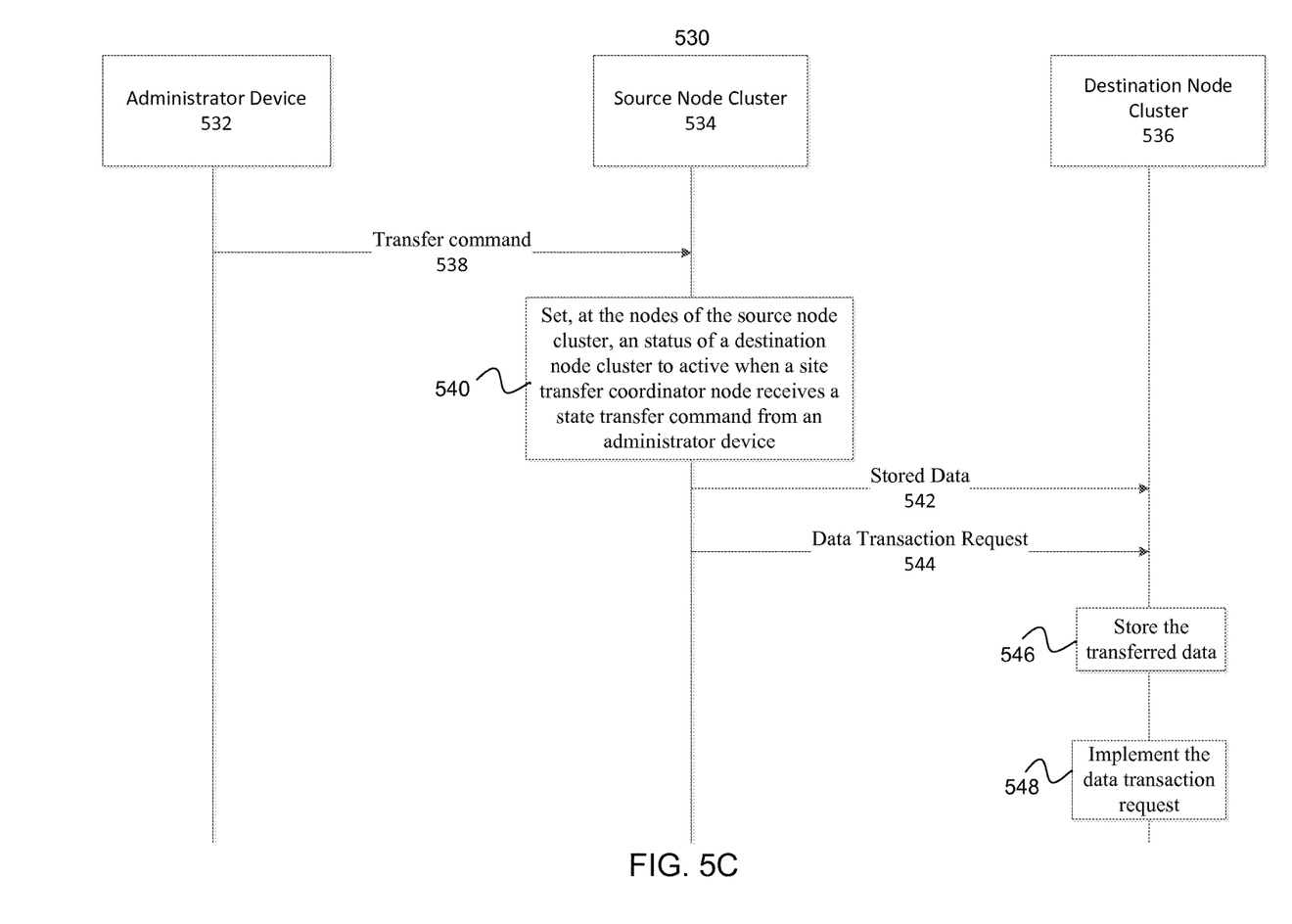
FIG. 5C a flow diagram of a system comprising an administrator device, a source node cluster, and a destination node cluster according to one embodiment.

FIG. 5C is a flow diagram of a system 530 comprising an administrator device 532, a source node cluster 534, and a destination node cluster 536. The administrator device 532 can include a processing device. The administrator device 532 can issue, by the processing device, a transfer command to a site transfer coordinator node of the source node cluster (block 538). The transfer command can designate a destination node cluster 536 for nodes in the source node cluster 534 to transfer data. The source node cluster can include nodes, where one of the nodes is a site transfer coordinator node. The nodes of the source node cluster 534 can set, at the nodes of the source node cluster, a status of a destination node cluster to active when the site transfer coordinator node receives a state transfer command from an administrator device (block 540). The nodes of the source node cluster 534 can transfer, to the destination node cluster, data stored at the nodes of the source node cluster (step 542). The nodes of the source node cluster 534 can forward, to the destination node cluster, a data transaction request to the destination node cluster when the status of the destination node cluster is active (step 544). The destination node cluster 536 can include one or more nodes. The nodes of the destination node cluster 536 can store the transferred data (block 546). The nodes of the destination node cluster 536 can implement the data transaction request (block 548).

In one example, the administrator device 532 can communicate a transfer command to the site transfer coordinator node of the source node cluster 534, wherein the transfer command designates the destination node cluster 536 for the nodes of the source node cluster 534 to transfer data. In another example, the site transfer coordinator node can receive a notification from the nodes of the source node cluster 534 when the stored data is transferred to the nodes of the destination node cluster 536. In another example, the administrator device is to communicate the transfer command when an event occurs, where the event include receiving, from an application, a following the sun command or receiving, from an application, a backup command. In another example, the nodes of the destination node cluster 536 can locally store the stored data and the transaction data.

In one example, the nodes of the source node cluster 534 and the destination nodes cluster 536 can store data in a key-value format to determine data locality. In another example, the nodes of the source node cluster 534 can identify data stored at the nodes of the source node cluster 534 to transfer to the nodes of the destination nodes cluster 536 using consistent hashing on the key-value formatted data. In another example, the source node cluster 534 can reside at a first site and the destination node cluster 536 can reside at a second site, wherein the first site and the second site are at different geographic locations. In another example, the nodes of the destination node cluster 534 can process local requests at the nodes of the destination node cluster 534 when the nodes of the source node cluster 536 have completed transferring the stored data.

Figure 6:
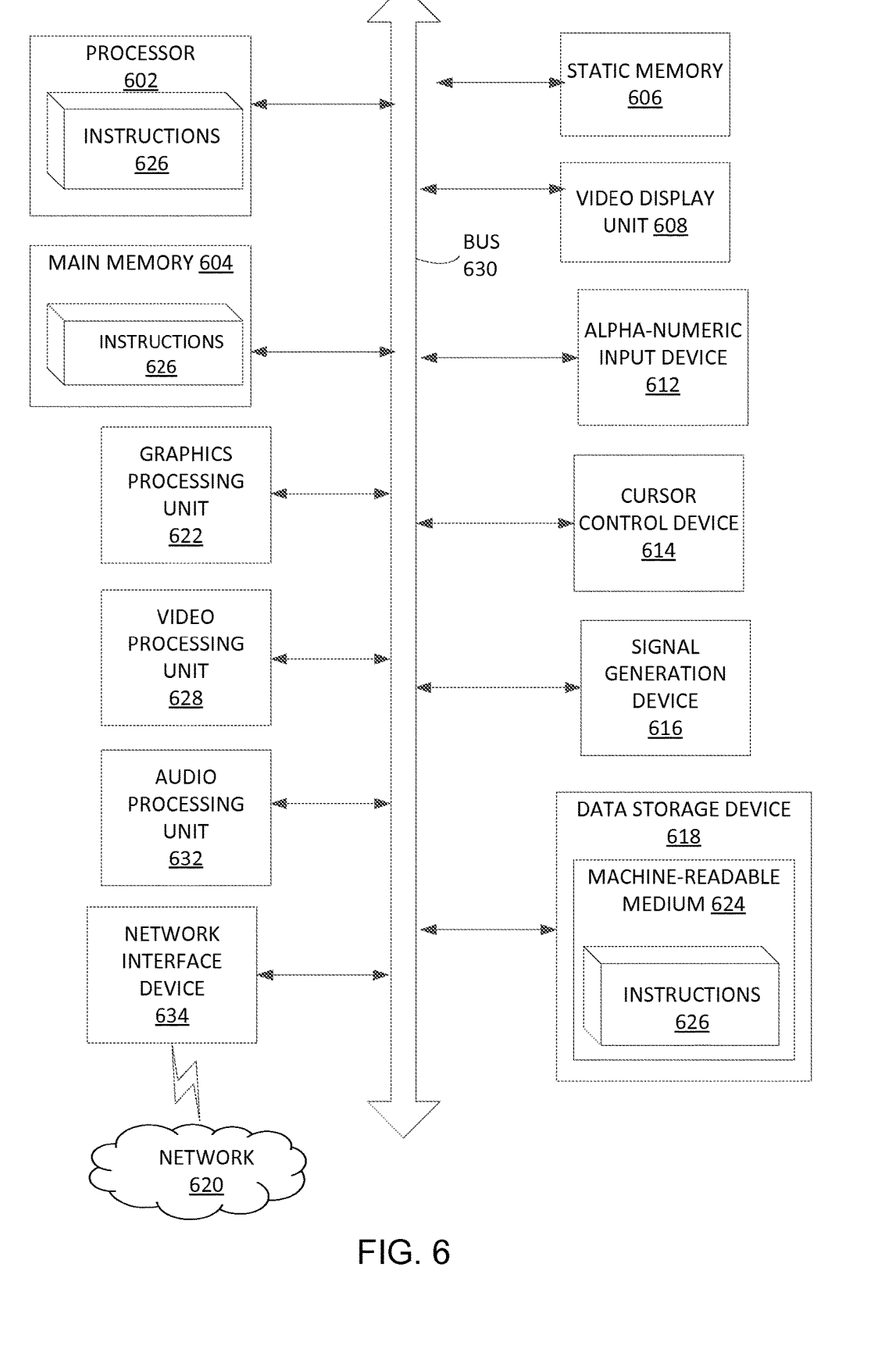
FIG. 6 illustrates a block diagram of one implementation of a computer system.

FIG. 6 illustrates a diagrammatic representation of a machine in the exemplary form of a computer system 600 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 608 (e.g., a liquid crystal display (LCD), a cathode ray tube (CRT), or a touch screen), an alphanumeric input device 612 (e.g., a keyboard), a cursor control device 614 (e.g., a mouse), and a signal generation device 616 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 620 via the network interface device 634.

While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A method comprising:

receiving a transfer command at a transfer coordinator node of a first node cluster at a first site to initiate a transfer of data from the first node cluster to a second node cluster at a second site, wherein the first node cluster comprises multiple nodes and the second node cluster comprises multiple nodes;

causing, by the transfer coordinator node, a status of the second site to be switched from an inactive status to an active status at the nodes of the first node cluster;

initiating, by the transfer coordinator node, a transfer of the data from the first node cluster to the second node cluster;

responsive to receiving a data transaction request during the transfer of the data, determining that the second node cluster has the active status at the nodes of the first node cluster, and causing the data transaction request to be transferred from the nodes at the first node cluster to the second node cluster during the transfer of the data, wherein the data being transferred is identified for transfer by the nodes of the first node cluster; and responsive to receiving the data transaction request during the transfer of the data, blocking a plurality of commands received at the nodes of the first node cluster, the plurality of commands comprising:

a prepare command associated with the data being transferred;

a commit command associated with the data being transferred; and a rollback command associated with the data being transferred.

2. The method of claim 1, further comprising receiving, at the transfer coordinator node, a notification that the transfer of the data is complete.

3. The method of claim 1, wherein the first site of the first node cluster and the second site of the second node cluster reside at different geographic locations.

4. The method of claim 1, wherein the data transaction request is a request from an application to access or modify data at the nodes of the first node cluster.

5. A non-transitory computer-readable storage medium having instructions that, when executed by a processing device, cause the processing device to:
receive a transfer command at the processing device of a transfer coordinator node of a source node cluster at a source site to initiate a transfer of data from the source node cluster to a destination node cluster at a destination site, wherein:
the source node cluster comprises multiple nodes, and the destination node cluster comprises multiple nodes;
cause, by the transfer coordinator node, a status of a destination node cluster to be switched from an inactive status to an active status at the nodes of the source node cluster;
initiate, by the transfer coordinator node, a transfer of the data from the source node cluster to the destination node cluster;
responsive to receiving a data transaction request during the transfer of the data, determine that the destination node cluster has the active status at the nodes of the source node cluster, and cause the data transaction request to be transferred from the nodes at the source node cluster to the destination node cluster during the transfer of the data; and
responsive to receiving the data transaction request during the transfer of the data, block a plurality of commands received at the nodes of the source node cluster, the plurality of commands comprising:
a prepare command associated with the data being transferred;
a commit command associated with the data being transferred; and
a rollback command associated with the data being transferred.

6. The non-transitory computer readable storage medium of claim 5, wherein the transfer command designates the destination node cluster for the nodes of the source node cluster to transfer data.

7. The non-transitory computer readable storage medium of claim 5, the processing device is further to: receive, at the processing device, a notification from the nodes of the source node cluster that the stored data is transferred to the nodes of the destination node cluster.

8. The non-transitory computer readable storage medium of claim 5, the processing device is further to:
communicate the transfer command when an event occurs, wherein the event comprises:
receiving, from an application, a following the sun command; or
receiving, from the application, a backup command.

9. The non-transitory computer readable storage medium of claim 5, wherein the nodes of the source node cluster and the destination nodes cluster are to store data in a key-value format to determine data locality.

10. The non-transitory computer readable storage medium of claim 9, the processing device is further to: identify data stored at the nodes of the source node cluster to transfer to the nodes of the destination nodes cluster using consistent hashing on the key-value formatted data.

11. The non-transitory computer readable storage medium of claim 5, wherein the source site of the source node cluster and the destination site of the destination node cluster reside at different geographic locations.

12. The non-transitory computer readable storage medium of claim 5, wherein the data being transferred is identified for transfer by a local site master associated with the source node cluster or by the nodes of the source node cluster.

13. The non-transitory computer readable storage medium of claim 5, wherein the data transaction request is a request from an application to access or modify data at the nodes of the source node cluster.

14. A transfer coordinator node comprising:
a memory to store data; and
a processing device operatively coupled to the memory, the processing device is to:
receive a transfer command at the transfer coordinator node of a first node cluster at a first site to initiate a transfer of data from the first node cluster to a second node cluster at a second site, wherein the first node cluster comprises multiple nodes and the second node cluster comprises multiple nodes;
cause a status of the second site to be switched from an inactive status to an active status at the nodes of the first node cluster;
initiate a transfer of the data from the first node cluster to the second node cluster;
responsive to receiving a data transaction request during the transfer of the data, determine that the second node cluster has the active status at the nodes of the first node cluster, and cause the data transaction request to be transferred from the nodes at the first node cluster to the second node cluster during the transfer of the data; and
responsive to receiving the data transaction request during the transfer of the data, block at least one command received at the nodes of the first node cluster, a plurality of commands received at the nodes of the source node cluster, the plurality of commands comprising:
a prepare command associated with the data being transferred;
a commit command associated with the data being transferred; and
a rollback command associated with the data being transferred.

15. The transfer coordinator node of claim 14, wherein the processing device is further to receive, at the transfer coordinator node, a notification that the transfer of the data is complete.

16. The transfer coordinator node of claim 14, wherein the first site of the first node cluster and the second site of the second node cluster reside at different geographic locations.

* * * * *